(12) United States Patent
Martin et al.

(10) Patent No.: US 7,757,184 B2
(45) Date of Patent: Jul. 13, 2010

(54) METHOD FOR SELECTING A BUTTON IN A GRAPHIC BAR AND RECEIVER FOR CARRYING OUT SAID METHOD

(75) Inventors: Jérôme Martin, Paris (FR); Hervé Dartigues, Paris (FR)

(73) Assignee: Thomson Licensing, Boulogne-Billancourt (FR)

(\*) Notice: Subject to any disclaimer, the term of this patent is extended or adjusted under 35 U.S.C. 154(b) by 474 days.

(21) Appl. No.: 11/666,381

(22) PCT Filed: Oct. 24, 2005

(86) PCT No.: PCT/FR2005/050892
§ 371 (c)(1),
(2), (4) Date: Apr. 26, 2007

(87) PCT Pub. No.: WO2006/045980
PCT Pub. Date: May 4, 2006

(65) Prior Publication Data
US 2007/0256031 A1    Nov. 1, 2007

(30) Foreign Application Priority Data
Oct. 28, 2004  (FR) .................................. 04 52472

(51) Int. Cl.
*G06F 3/00* (2006.01)
*G06F 3/048* (2006.01)

(52) U.S. Cl. ....................... 715/810; 715/779; 715/821; 715/765

(58) Field of Classification Search ................. 715/764, 715/779, 810, 821, 829, 835, 840, 844
See application file for complete search history.

(56) References Cited

U.S. PATENT DOCUMENTS

| | | | | |
|---|---|---|---|---|
| 5,833,470 | A * | 11/1998 | Harrison et al. | 434/323 |
| 6,239,803 | B1 * | 5/2001 | Driskell | 715/810 |
| 6,907,575 | B2 * | 6/2005 | Duarte | 715/784 |
| 7,574,672 | B2 * | 8/2009 | Jobs et al. | 715/830 |
| 2003/0013483 | A1 * | 1/2003 | Ausems et al. | 455/556 |
| 2003/0048309 | A1 * | 3/2003 | Tambata et al. | 345/810 |
| 2003/0164927 | A1 | 9/2003 | Tsukada | |
| 2005/0076309 | A1 * | 4/2005 | Goldsmith | 715/811 |

OTHER PUBLICATIONS

Y. Kwak et al: "Characterisation of a desktop LCD projector", Displays, Elsevier Science Publishers BV, Barking, GB, vol. 21, No. 5, Dec. 2000, pp. 179-194.
Search Report Dated Sep. 21, 2006.

\* cited by examiner

*Primary Examiner*—X. L Bautista
(74) *Attorney, Agent, or Firm*—Robert D. Shedd; Jeffrey M. Navon

(57) ABSTRACT

The present invention relates to a method of selecting buttons displayed in a graphics bar on a display screen. The entry of a first navigation command triggers the selection of a first button adjacent to the one selected in the bar. This first button is graphically highlighted. Then, the entry of a second navigation command in order to select a second button adjacent to the one previously selected triggers the selection and highlighting of a third button located in another position on the bar serving as a starting point for subsequent navigation commands. In this way, the user can skip from one button to another button located in any other location in the bar.

13 Claims, 3 Drawing Sheets

Figure 1:
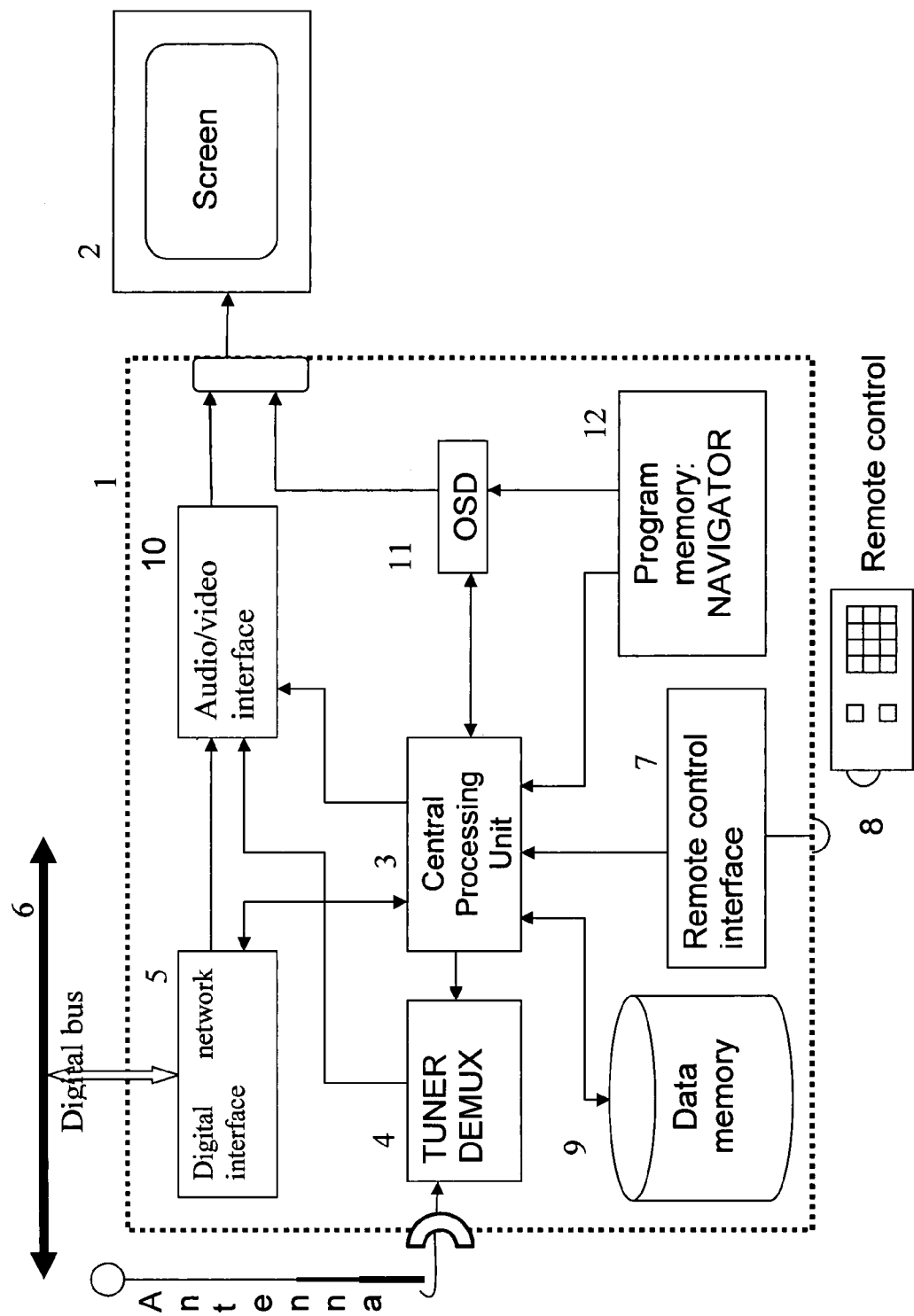

METHOD FOR SELECTING A BUTTON IN A GRAPHIC BAR AND RECEIVER FOR CARRYING OUT SAID METHOD

This application claims the benefit, under 35 U.S.C. §365 of International Application PCT/FR2005/050892, filed Oct. 24, 2005, which was published in accordance with PCT Article 21(2) on May 4, 2006 in French and which claims the benefit of French patent application No. 0452472, filed Oct. 28, 2004.

The invention relates to a method of selecting buttons displayed in a bar on a display screen, and a receiver provided with a user interface using the method.

A user interface normally uses descriptive data to generate menus that can be displayed on a television screen, this data enabling, among other things, the user to filter audiovisual contents and choose the content that interests him. The MPEG-7 standard specifies descriptive data associated with audiovisual contents. The MPEG-7 standard is distributed by the ISO under the reference ISO/IEC JTC1/SC29/WG11—N5525, published in March 2003. If these contents are received from a transmission network, the descriptive data is stored in a local database and constantly updated according to the contents that can be accessed on the network. Other descriptive data also exists in other media such as PVR (Personal Video Recorders). The audiovisual contents can also be downloaded at the request of the user of a bidirectional network. In this case, the user receives a catalog, chooses the content in the catalog that interests him and activates his download into the memory of his appliance. The data describing the contents is stored in a database and grouped according to certain criteria such as theme, language, certification, etc.

An electronic program guide (EPG) can be used, among other things, to select an audiovisual content from a list displayed on a screen or functions to be applied to one or more contents. When a large number of audiovisual contents can be accessed from the terminal, it is necessary to select certain categories. A simple way is to display a menu bar (or bargraph) comprising buttons in the form of a cell containing a keyword or an icon corresponding to each category; the user will move an index marker from button to button in order to highlight the category that he wants, then select it.

Navigation over the elements of a button bar is normally limited to two directions: if the button bar is arranged horizontally, navigation is performed to the right or to the left, while if the button bar is vertical, navigation is performed upward or downward. One known way consists in performing the movement by activating the navigation key of a remote control representing the direction. This navigation is in particular described in patent FR 2 752 314 filed by the applicant and published on Jan. 15, 1999. However, there too, there can be a large number of categories and navigation can become tedious, with the user scrolling through a large number of elements before finding the one he is looking for.

Application EP 251 515 describes a method for selecting a position within a clip. Key images are extracted from the clip and displayed in the form of selectable icons. The icon in the middle can be used to read at normal speed, the icons on the left and on the right being used to advance and rewind the images at faster or slower speeds. The icons to the extreme left and to the extreme right are used to position the video either at the start of the clip or at the end of the clip. This prior art teaches that a limited number of icons appears in the icon bar. When a user activates an icon at one end of the bar, it is not tedious to return to a center position by working back via the same icons. Such is not the case when the list of elements is long and, from a given element, the user wants to select another element located in a position in the list that is far removed.

The invention describes a novel way of selecting a button from a button bar, making it possible to reach the functions or elements more easily and more quickly, avoiding certain repetitions of navigation commands to reach a given result.

The subject of the invention is a method of selecting buttons displayed in a graphics bar on a screen, comprising a first step for highlighting a first button, and a step for entering a navigation command in order to select a second button adjacent to the one previously selected, characterized in that the entry step triggers the selection and highlighting of a third button located in another position on the bar, which will serve as a starting point for subsequent navigation commands.

In this way, the user can navigate from button to button in the bar and, having arrived at a certain button, the latter can be used by him to return to another position in the bar without needing to reselect all the buttons and start again from this position to continue navigating.

A first refinement consists in executing a command associated with the selected button by the entry of an activation command by a user. Thus, the user can navigate in the bar to choose the right button, and once he has found it, activate the corresponding command. A variant consists in executing a command associated with a button each time a new button is selected. In this way, the user can act immediately on the operation of his appliance.

Another refinement consists in having the execution of the command trigger an update of the audiovisual content displayed on the screen background. Thus, the user sees the action of his command.

Another refinement consists in placing the second button at one end of the button bar. In this way, the user having reached one end can continue navigating from another position avoiding working backward too long in the bar. Another refinement consists in having each end provided with buttons enabling the user to continue navigating from two different positions.

Another refinement consists in having the second navigation command trigger the repositioning of the button bar for the duly selected third button to be displayed in the middle of the screen. In this way, the user improves the situation of the new navigation environment.

Another refinement consists in having the buttons of the bar make it possible to vary the playback speed of an audiovisual content being displayed and previously stored. In this way, the user can, by using the navigation keys, very easily vary the playback speed of the displayed document.

Another refinement consists in having the second navigation command also trigger the execution of a command not associated with the selected button. In this way, the user can use a command to select a second button to both reposition in the menu bar and perform a determined action. For example, in the case where the audiovisual document is received and stored while viewing, the user can both select the normal playback speed and view the document as it is received, that is with no time shift.

The invention also relates to an audiovisual receiver giving access to a set of audiovisual contents, comprising a display means for generating graphic pages to a display device, the graphic pages comprising at least one button bar, a means of entering first navigation commands triggering the selection and graphic highlighting of a first button adjacent to the one selected, characterized in that it comprises a second means of entering a second navigation command in order to select a second button adjacent to the one previously selected and triggering the selection and highlighting of a third button located in another position on the bar.

Figure 2:
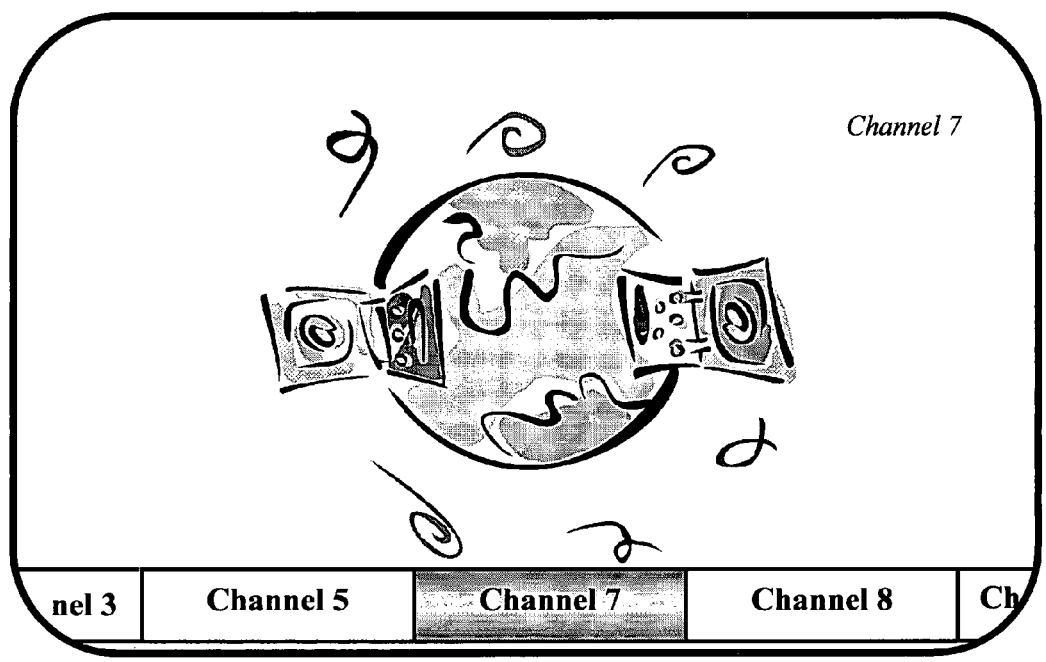
Figure 3:
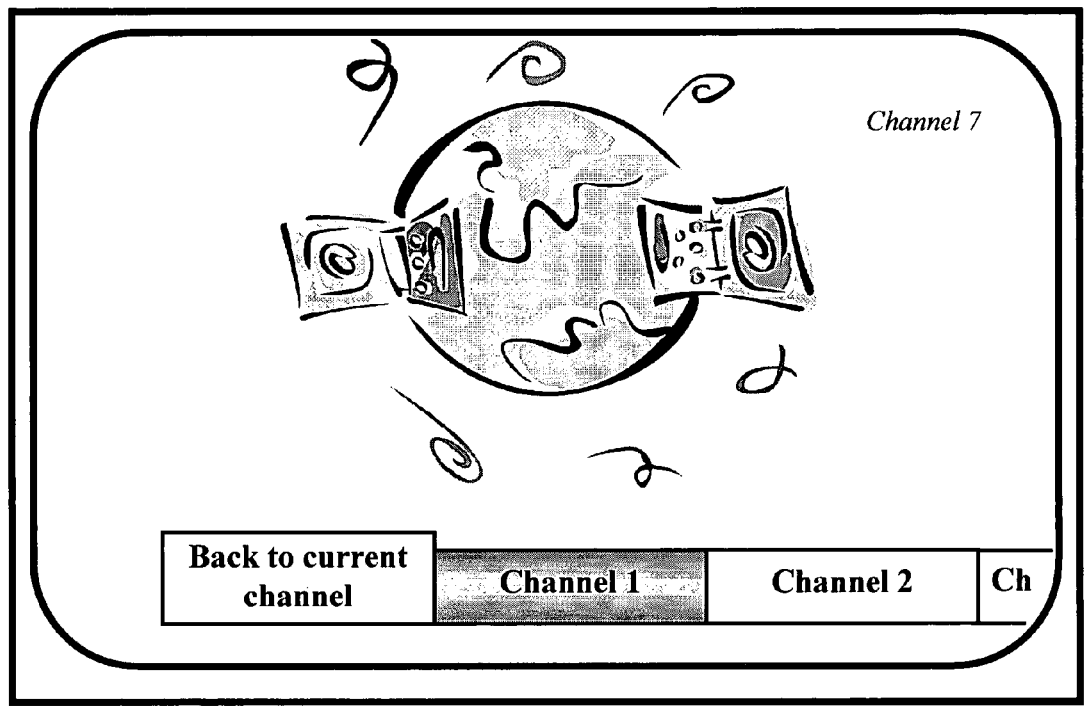
Figure 4:
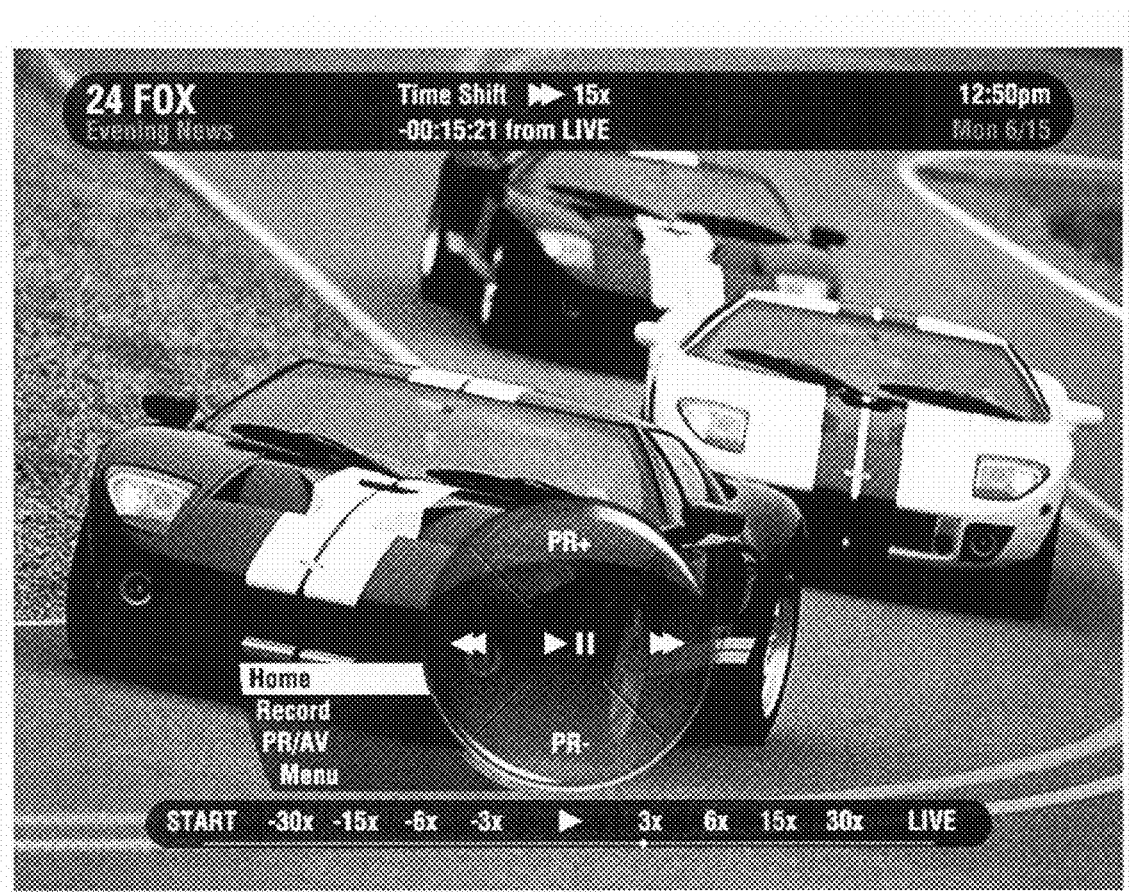

Other characteristics and advantages of the invention will now become apparent with more detail within the context of the description that follows of exemplary embodiments, given by way of illustration, referring to the appended figures in which:

FIG. 1 is a block diagram of a multimedia receiver for implementing an exemplary embodiment of the invention, FIG. 2 is an exemplary screen appearance comprising a menu bar showing a list of channels, FIG. 3 is another screen appearance showing a button at the end of the menu bar, FIG. 4 is another exemplary screen appearance comprising a menu bar for controlling the playback speed of an audiovisual document while receiving it and storing it.

The description begins with the structure of a multimedia receiver 1 provided with a display device 2 according to an exemplary embodiment of the invention. A set-top box is described here, but other appliances can also be envisaged and applied to the present invention, for example a personal computer or a PVR (for example the THOMSON DTH7000 produced and marketed by the applicant) or any appliance capable of accessing audiovisual contents and having means of creating and displaying menus. The receiver comprises a central processing unit 3 linked to a program memory 12, and an interface 5 for communication with a high speed digital bus 6 enabling audio/video data to be transferred in real time. This network is preferably public and provides access to remote services, the commonest being the IP network. The receiver can also receive audio/video data from a transmission network via a receive antenna associated with a demodulator 4. The receiver also comprises an infrared signal receiver 7 for receiving the signals from a remote control 8, a memory 9 for storing audiovisual contents and a database, and an audio/video decoding logic 10 for generating the audiovisual signals sent to the television screen 2. The remote control is provided with direction keys ↑, ↓, → and ← and "OK" and "Select" keys, whose function will be described later. The memory 9 is advantageously a hard disk holding several hundreds of megabytes, making it possible to record at least several hours of audiovisual contents. These audiovisual contents are identified by a title stored in the database.

The receiver also comprises a circuit 11 for displaying data on the screen, often called OSD (On Screen Display) circuit. The OSD circuit 11 is a text and graphics generator which makes it possible to display menus and pictograms on screen (for example, a number corresponding to the channel being viewed) and which makes it possible to display navigation menus in accordance with the present invention, and in particular one or more button bars. The OSD circuit 11 is controlled by the central processing unit 3 and the navigator 12. The navigator 12 is advantageously implemented in the form of a program module stored in a read-only memory. It can also be implemented in the form of an ASIC-type custom circuit for example.

The digital bus 6 and/or the transmission network transmit to the receiver data comprising multimedia contents and data describing these contents. This data originates either from a transmission network, or from the digital network 6. The descriptive data comprises elements, normally called "attributes", for classifying the accessible multimedia contents. The descriptive data is, for example, metadata, defined according to the MPEG-7 standard. This data is stored in the database of the memory 9 of the receiver and continually updated. The navigator 12 then extracts the information from this database and processes it to produce the navigation menus displayed on the screen and, in particular, one or more button bars.

According to a preferred exemplary embodiment, the navigator 12 displays a menu bar containing a list of attributes associated with the audiovisual contents that can be accessed from the appliance. This menu bar is displayed overlaid on the video content previously selected by the user. FIG. 2 shows a screen appearance where the menu bar contains a list of channels. On launching the navigator, the audiovisual content displayed-on the screen background corresponds to the channel whose identifier in the menu bar is highlighted. The highlight (it can also be said that a button has the focus) is obtained by giving the cell a colored background, or a text that is blinking or in bold, or any other distinguishing element that the other cells or cell contents do not have. The user navigates using the arrow keys → and ←, and can thus change the button in the bar that has the focus. If the user wants to play back the content of the selected channel, he presses the "Select" button.

In the context of our preferred exemplary embodiment, the list of attributes contains a start button and an end button. At the start of navigation, the button identifying the channel currently being viewed is the one that has the focus. The user starts navigating from this button. Still by activating the same navigation button, the user reaches one of these two buttons at the start or end of the bar, in this case the first channel in the list or the last one. If the list of channels is long, the identifier of the channel currently being viewed does not remain for long in the menu bar. If we assume that the user has not found what he is looking for, the prior art teaches that he must navigate in the other direction and work back through the same buttons before seeing those that are at the other end of the bar currently displayed. According to a preferred embodiment of the present invention, the first and/or the last button of the bar displayed can be used to select the button corresponding to the channel currently being viewed and therefore return to a determined navigation position to then continue navigating. According to a refinement, certain points in the button bar have buttons that can be used to select the button corresponding to the channel currently being viewed. If the navigation is fast, for example by holding down the direction button, the jump is not performed. If the speed is slow, the jump is performed. Another way of proceeding involves selecting the button and performing the jump by pressing an activation button, the "OK" key for example.

If we take the appearance of the screen illustrated by FIG. 3, the user repeatedly presses the direction arrow ← and the button containing the identifier of the first channel has the focus. The user does not want to select it, so he then presses the direction arrow ← once again to highlight the cell entitled "Back to current channel". If he selects this cell by pressing the "Select" key, he returns to the situation described by FIG. 2. Selecting the current channel by the "Return to current channel" button triggers a repositioning of the channel bar to show the current channel approximately in the middle of the screen. After this, by pressing the direction arrow →, he can start again in the opposite direction from the position of the current channel. As a variant, the activation of the button having the focus is performed at the end of a time delay. For example, after 10 seconds with no new navigation command, the channel whose identifier has the focus is activated.

In the same way, when one end of the button bar is displayed on screen, the navigator adds to the end of the bar a last button entitled "Back to current channel" which enables him as previously to return to the position of the channel currently being viewed.

Other attributes can also be displayed in the form of a list displayed by a menu bar. Below are some examples of lists of elements set by a content provider to classify the available contents:

language: English, French, German, Italian, Arabic, other;
theme: film, information, documentary, sport, game/show, etc;
subtheme:
film: {adventure, drama, erotic, police, fiction, other};
information: {news, radio, weather, stock market, sport, other};
content: {general, nature, culture, social, history};
game/show: {general, variety, circus, Talk Show, circus};
sport: {General, football, tennis, basketball, athletics, aquatic};
source: Sat. TV, Satellite channel, room DVD, video recorder, Web.
producer: Spielberg, Coppola, Besson, Kubrick, Truffaud.

Another exemplary embodiment using a button bar according to the invention relates to the control of the playback speeds of a recorded document. The receiver is the one described by FIG. 1 and the menu displayed is, for example, the one shown in FIG. 4. An audiovisual content is transmitted over a channel, and received by the antenna of the receiver 1, demodulated by the demodulator and displayed on the screen 2. According to a method known by the name of "time shift", the user can record the content on reception and read the content from the memory. In this way, the user can see a part of the transmission time-shifted and rewind to replay a clip that he has already seen. He can also apply a pause to resume reading the program time-shifted. The "time shift" method uses the memory 9 as a buffer memory with a write pointer and a read pointer. If the two pointers are in the same position, the user is watching "Live". If the pointers are not in the same position, the user is watching time-shifted. In the latter case, the user can vary the reading speed.

FIG. 4 shows a screen appearance with a video content being recorded on the screen background, a user interface in the form of a circle with four accessible commands and a menu bar. This interface is particularly well suited to a remote control having a control unit with several free movements, for example: push, right, left, up, down, rotate right, rotate left. The button bar offers several playback speeds, either playing the document forward or playing the document backward. If the user chooses a reverse speed (or a speed slower than normal speed), the time shift increases progressively. If he chooses to play back the document fast, the time shift reduces and the moment of the content being played back ends by being that transmitted at the present moment. The button bar can be used to select the different speeds. The reference speed, which is the normal speed, is represented by a button in the center of the bar (containing a triangle pointing to the right: ▶. The buttons for the different speeds forward or backward are arranged either side of the reference speed button. The speeds are defined by a multiplying factor: "×3", "×6", "×15" or "×30", these identifiers being inscribed in the buttons. Unlike the previous exemplary embodiment which enables channels to be selected, the speed indicated in the button having the focus is directly applied to the document without the user needing to confirm his choice (by pressing a button or waiting for a time delay to end).

If we assume at a given moment that the document being viewed has a slight time shift from live, when a speed other than the reference speed is chosen, the screen 2 plays back the images at the speed corresponding to the button having the focus. Selecting a fast forward speed will make it possible to return to the present time and thus no longer use the buffer memory 9 to store the content.

However, if the user is very far backward in time, and he wants to return to the present moment ("Live"), he must first speed up the reading speed by selecting the speeds: "×3", "×6", "×15" or "×30". However, even at the maximum speed, it takes a long time to return to the "Live" position. Thus, to reduce this waiting time and return to the present moment instantaneously, the navigator displays at the end of the button bar a cell marked "LIVE" after the last selectable speed. A press on the right arrow makes it possible to select this button briefly. The selection involves both returning to the normal speed and to the present time, and the navigator positions the focus on the button corresponding to the normal speed. According to a first embodiment, the button used to jump and apply the focus elsewhere in the button bar is not highlighted. According to a variant, the navigation command towards the button enabling the jump graphically highlights said button for a fairly short time, typically one second, then the jump is performed to graphically highlight the button that is the object of the jump. In this way, the user more effectively realizes that the switch to this jump button is temporary and his object is to position the focus at another position.

If, however, the user wants to view the recorded content again, he will select the buttons to the left of the one representing the normal speed, which will increase the time shift (reading the document backward). If the user wants to return to the start of the recording, he can do so by speeding up the reverse reading of the document to the maximum, but this can take some time. To avoid waiting too long, the navigator has thought to place a button at the extreme left of the menu bar enabling him to return immediately to the start of the recording. If the user starting from the "−30×" cell moves the focus to this first cell called "START", the read pointer is positioned at the moment where the recording began. With the playback of the document then being performed at normal speed, the navigator therefore positions the focus on the button marked by the triangle pointing to the right: ▶.

It can therefore be seen that the provision of the two buttons at the two ends of the menu bar makes it possible to offer the user direct access to certain functions and, because of this, faster and more effective navigation.

Although the present invention has been described with reference to the particular embodiments illustrated, it is by no means limited to these embodiments, only being limited by the appended claims. It will be noted that changes or modifications can be made by those skilled in the art to the embodiments described previously, without in any way departing from the framework of the present invention.

The invention claimed is:

1. A method of selecting buttons displayed in a graphics bar on a screen, the activation of a button activating the execution of the function associated with the button, comprising a first step for highlighting a first button, and a step for entering a navigation command in order to highlight a second button adjacent to the one previously selected, wherein a step of activation of the second highlighted button triggers the highlighting of a third button located in another position on the bar and the execution of the function associated with the third button, said third button serving as a starting point for subsequent navigation commands.

2. The method of selecting buttons as claimed in claim 1; wherein the step of activation consists in maintaining the navigation command after a determined time.

3. The method of selecting buttons as claimed in claim 1; wherein the step of activation consists in entering a commit command which is not a navigation button.

4. The method of selecting buttons as claimed in claim 2; wherein the maintaining of the navigation command beyond a determined time or the entry of the commit command triggers an update of the audiovisual content displayed on the screen background.

5. The method of selecting buttons as claimed in claim 1; wherein if the second button is located at one end of the button bar then the step for entering the navigation command aiming to select it triggers the selection and highlighting of the third button.

6. The method of selecting buttons as claimed in claim 5; wherein two second buttons are disposed at the two ends of the bar, the navigation to these second buttons triggering the selection of two different third buttons.

7. The method of selecting buttons as claimed in claim 1; wherein the entry of the navigation command also triggers a step for repositioning the buttons of the bar for the third duly selected button to be displayed in the middle of the screen.

8. An audiovisual receiver comprising a display means for generating graphic pages to a display device, the graphic pages comprising at least one button bar, a means of graphically highlighting a first button and a means of entering a navigation command in order to highlight a second button adjacent to the one previously selected and an activation means of a button activating the execution of a function associated with this button, wherein the activation means of a button triggers the means of graphically highlighting a third button located in another position on the bar if the command entered complies with a particular characteristic and the execution of the function associated with the third button, said third button serving as a starting point for subsequent navigation commands.

9. The audiovisual receiver as claimed in claim 8; wherein it comprises the activation means of a button consists in maintaining the navigation command beyond a determined time.

10. The audiovisual receiver as claimed in claim 9; wherein the maintaining of the navigation command beyond a determined time or the entry of the commit command activates a display means for updating an audiovisual content displayed on the screen background.

11. The audiovisual receiver as claimed in claim 8; wherein the activation means of a button consists in entering on the entry means a commit command that is not a navigation key.

12. The audiovisual receiver as claimed in claim 8; wherein the means of entering a navigation command activates the display means to reposition the buttons of the bar for the third duly selected button to be displayed in the middle of the screen.

13. The audiovisual receiver as claimed in claim 8; wherein, if the second button is located at one end of the button bar, then the means of entering the navigation command aiming to select it triggers the selection of the third button and activates the means of highlighting the third button.

* * * * *